US011795939B2

(12) United States Patent
Kaiya et al.

(10) Patent No.: US 11,795,939 B2
(45) Date of Patent: Oct. 24, 2023

(54) PUMP INSTALLATION MEMBER

(71) Applicant: NITTO KOHKI CO., LTD., Tokyo (JP)

(72) Inventors: Kazumasa Kaiya, Tokyo (JP); Hiroshi Nishitsuji, Tokyo (JP)

(73) Assignee: NITTO KOHKI CO., LTD., Tokyo (JP)

( * ) Notice: Subject to any disclaimer, the term of this patent is extended or adjusted under 35 U.S.C. 154(b) by 262 days.

(21) Appl. No.: 17/329,812

(22) Filed: May 25, 2021

(65) Prior Publication Data

US 2021/0277887 A1 Sep. 9, 2021

Related U.S. Application Data

(63) Continuation of application No. PCT/JP2019/047769, filed on Dec. 6, 2019.

(30) Foreign Application Priority Data

Dec. 11, 2018 (JP) ................................ 2018-231864

(51) Int. Cl.
| F04B 53/00 | (2006.01) |
| F04B 1/02 | (2006.01) |
| F04B 53/22 | (2006.01) |
| F16M 7/00 | (2006.01) |
| F04B 17/03 | (2006.01) |

(52) U.S. Cl.
CPC .............. *F04B 53/003* (2013.01); *F04B 1/02* (2013.01); *F04B 53/22* (2013.01); *F16M 7/00* (2013.01); *F04B 17/03* (2013.01)

(58) Field of Classification Search
CPC .......... F04B 1/02; F04B 17/03; F04B 25/005; F04B 53/003; F04B 53/22; F16M 7/00
USPC ......................................................... 417/363
See application file for complete search history.

(56) References Cited

U.S. PATENT DOCUMENTS 5,344,291 A * 9/1994 Antkowiak ........... F04D 13/021
              417/361
7,278,834 B2 * 10/2007 Herrick ............... F04B 39/0044
              417/363

(Continued)

FOREIGN PATENT DOCUMENTS

| JP | S58122048 | 8/1983 |
| JP | H05202846 | 8/1993 |
| JP | 2003515061 | 4/2003 |

(Continued)

OTHER PUBLICATIONS

International Search Report for International Application PCT/JP2019/047769, dated Feb. 10, 2020.

*Primary Examiner* — Charles G Freay
(74) *Attorney, Agent, or Firm* — Burris Law, PLLC

(57) ABSTRACT

A pump installation member has a first and second mutually discrete support members to be secured to predetermined installation portions of the first and second pump units, respectively. The pump installation member further has installation elastic members to be set between the first and second support members and the installation surface. The installation elastic members are elastically deformable as the first and second support members are displaced toward the installation surface when the first and second support members are fastened to the installation surface.

8 Claims, 3 Drawing Sheets

(56) References Cited

U.S. PATENT DOCUMENTS

2004/0131481 A1* 7/2004 Chen .................. F04B 39/0044
 417/363
2006/0275160 A1  12/2006 Leu et al.

FOREIGN PATENT DOCUMENTS

| JP | 2004511724 | 4/2004 |
| JP | 2006322459 | 11/2006 |
| WO | 2001038743 | 5/2001 |
| WO | 2002033256 | 4/2002 |

* cited by examiner

PUMP INSTALLATION MEMBER

CROSS-REFERENCE TO RELATED APPLICATIONS

This application is a continuation of International Application No. PCT/JP2019/047769, filed on Dec. 6, 2019, which claims priority to and the benefit of Japanese Patent Application No. 2018-231864, filed on Dec. 11, 2018. The disclosures of the above applications are incorporated herein by reference.

FIELD

The present disclosure relates to a pump installation member for installing a twin pump on an installation surface, the twin pump having one motor with output shafts respectively extending to opposite sides thereof, and a first and second pump units attached to the motor in such a manner as to hold the motor therebetween from the opposite sides and driven by the output shafts respectively associated therewith.

BACKGROUND

In the above-described twin pump, the first and second pump units have identical casings. The casings are provided with installation portions at predetermined positions, respectively, for installation of the twin pump onto an installation surface (see Japanese Translation of PCT International Application Publication No. 2004-511724 and Japanese Translation of PCT International Application Publication No. 2003-515061). When the first and second pump units are attached to the motor accurately, the pump can be installed such that the installation portions of the first and second pump units correctly face the installation surface. In reality, however, the first and second pump units may be attached to the motor slightly off the correct mounting positions. In such a case, the installation portions of the first and second pump units may be misaligned relative to each other, making it impossible to correctly install the pump on the installation surface.

SUMMARY

An object of the present disclosure is to provide a pump installation member enabling a twin pump to be correctly installed on an installation surface even when installation portions of first and second pump units for installation of the twin pump onto the installation surface are misaligned relative to each other.

Solution to Problem

That is, the present disclosure provides a pump installation member for installing a twin pump on an installation surface, the twin pump having one motor with output shafts respectively extending to opposite sides thereof, and a first and second pump units attached to the motor in such a manner as to hold the motor therebetween from the opposite sides and driven by the output shafts respectively associated therewith. The pump installation member has a first and second support members to be secured to predetermined installation portions of the first and second pump units, respectively. The first and second support members are separate members. The pump installation member further has installation elastic members to be set between the first and second support members and the installation surface. The first and second support members are configured to be fastened to the installation surface by pressing the first and second support members toward the installation surface through the installation elastic members.

Here, the term "installation elastic members to be set between the first and second support members and the installation surface" should not be construed as being limited to a configuration in which the installation elastic members are "directly sandwiched between the first and second support members and the installation surface, on the other hand", but should be construed as meaning that the installation elastic members are set at an intermediate position between the installation surface and the first and second support members in the vertical direction of the twin pump on the assumption that the twin pump is installed on the installation surface by being placed thereon from above.

With the above-described configuration, even when the installation portions of the first and second pump units are misaligned relative to each other, the installation elastic members can be set between the first and second support members and the installation surface while being pressed and deformed according to the misalignment between the installation portions. It is therefore possible to securely install the twin pump to the installation surface.

The pump installation member may have a connecting elastic member connecting the first and second support members. With this configuration, the first and second support members can be handled as an integral structure, which facilitates the handling of the pump installation member. In addition, even when the installation portions of the first and second pump units are misaligned relative to each other, the connecting elastic member is elastically deformed to allow the first and second support members to be properly attached to the installation portions of the first and second pump units, respectively.

Specifically, the first and second support members may each be a flat plate-shaped member.

Further, the connecting elastic member may be attached to the first and second support members on a side thereof facing the installation surface. It should be noted that the connecting elastic member may also be attached to the first and second support members on a side thereof facing away from the installation surface, and that the connecting elastic member may also be provided so as to be located between the first and second support members.

More specifically, the arrangement may be as follows. The first and second support members are each a flat plate-shaped member, and are connected to each other by the connecting elastic member such that the first and second support members are disposed on a single plane so as to be spaced from and opposite to each other, with opposing edges thereof being parallel to each other.

Even more specifically, the connecting elastic member may have two elongated elastic members extending along both sides, respectively, of the first and second support members disposed to oppose each other.

Further, the installation elastic members may be configured to extend from the connecting elastic member to respective positions extending outward from side edges of the first and second support members.

In the above-described case, the installation elastic members may respectively have bolt insertion holes extending therethrough from a side closer to the first and second support members toward a side closer to the installation surface to pass shanks of bolts for fastening the first and second support members to the installation surface, so that, by inserting bolts through the bolt insertion holes and threadedly engaging the bolts with threaded holes provided in the installation surface, the installation elastic members can be pressed by heads of the bolts.

The connecting elastic member may have a fitting projecting portion fitted between the opposing edges of the first and second support members and bonded to the first and second support members along the opposing edges thereof. The fitting projecting portion allows the first and second support members to be handled as a single plate-shaped structure even more effectively.

An embodiment of a pump installation member according to the present disclosure will be explained below on the basis of the accompanying drawings.

DRAWINGS

DETAILED DESCRIPTION

Figure 1:
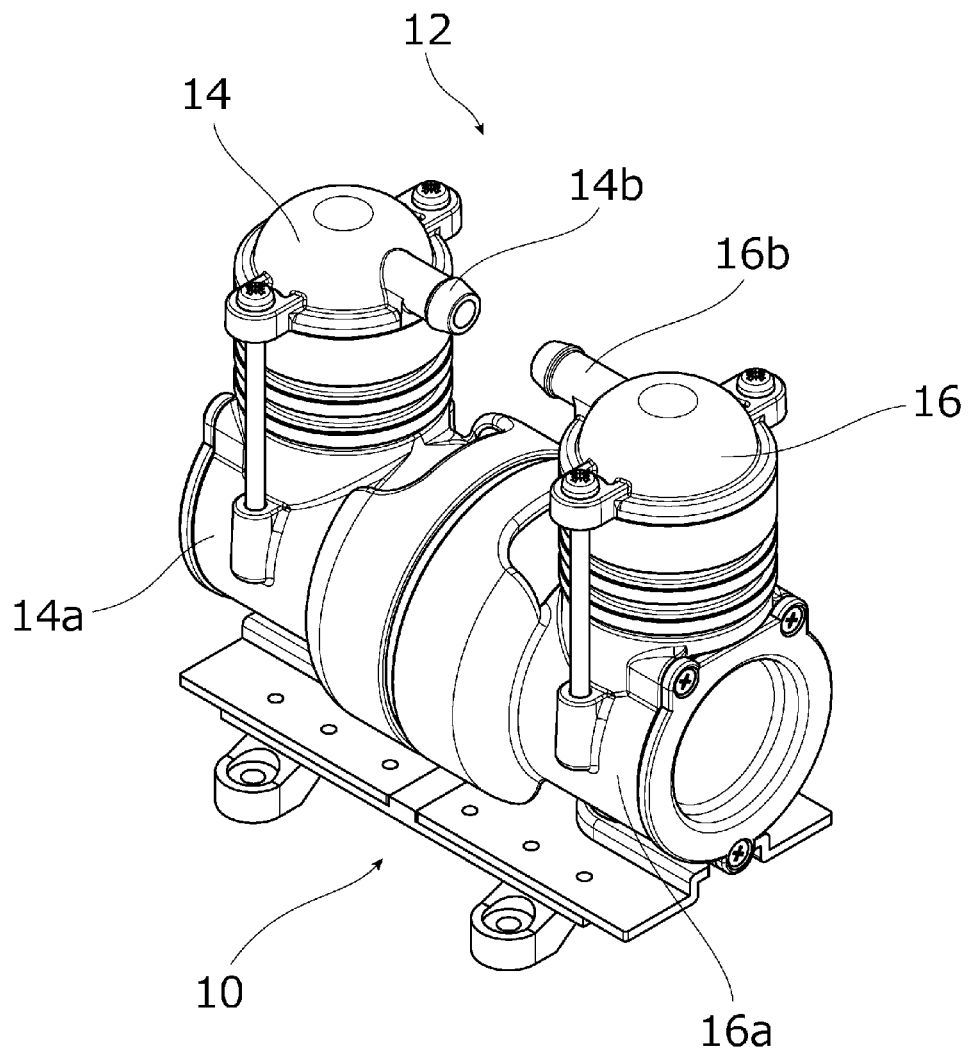
FIG. 1 is a perspective view of a twin pump having attached thereto a pump installation member according to the present disclosure.
Figure 2:
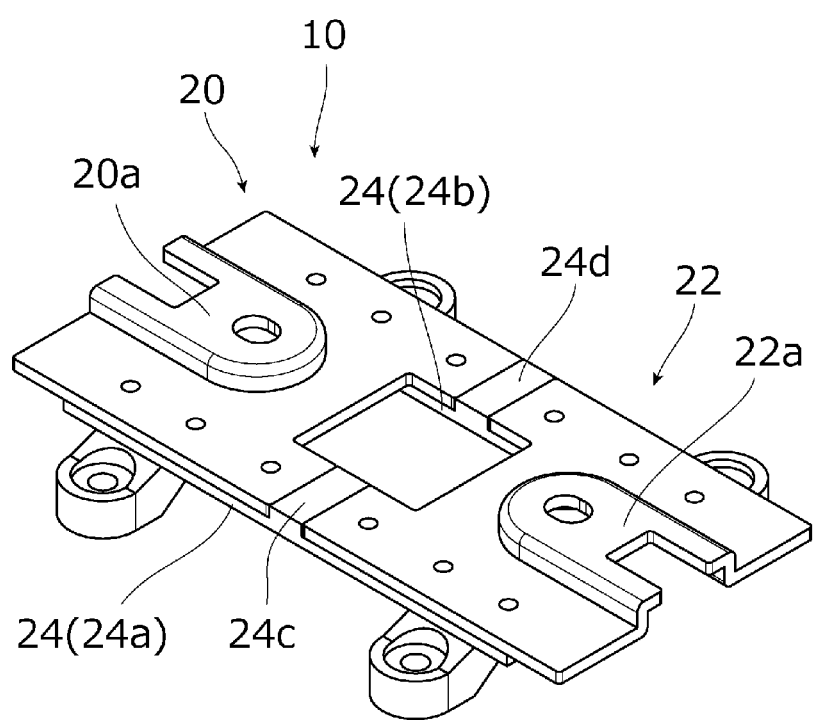
FIG. 2 is a perspective view of the pump installation member.
Figure 3:
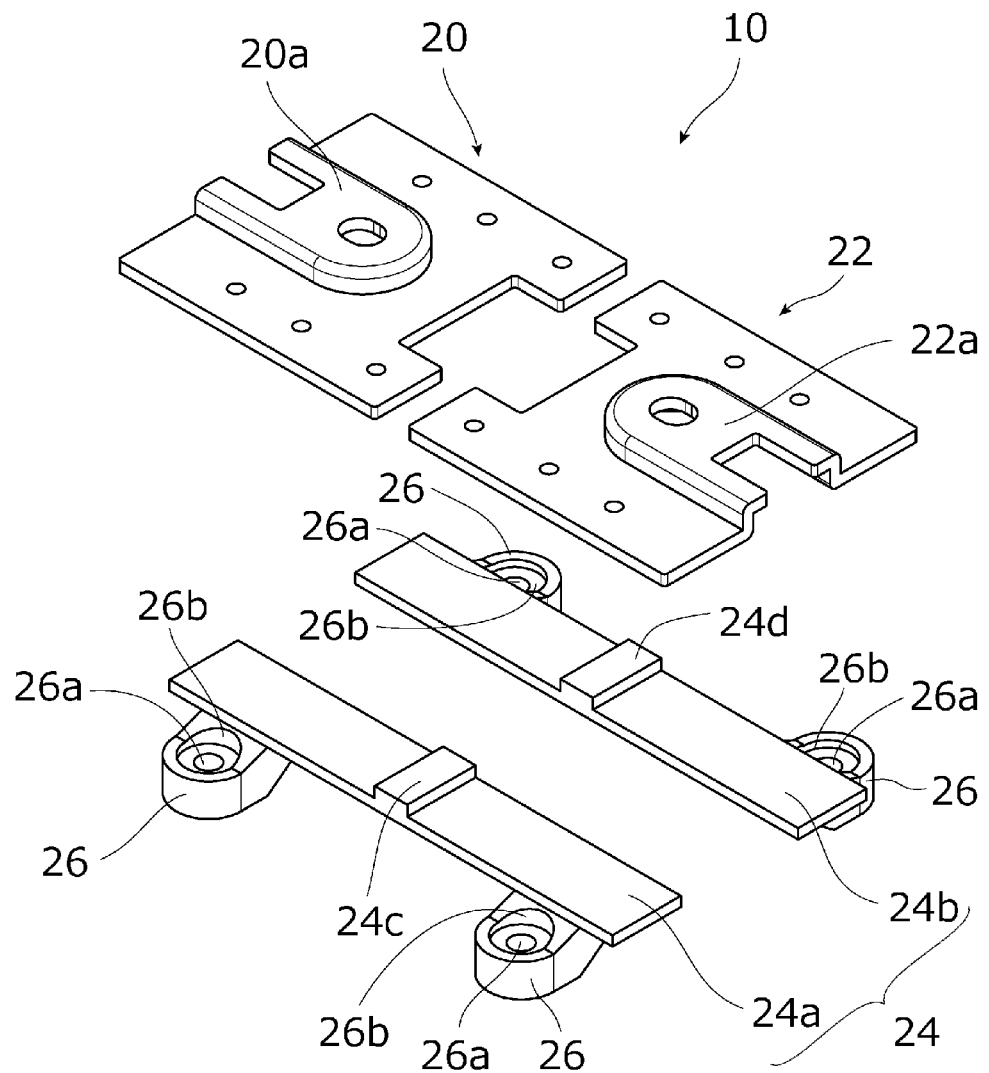
FIG. 3 is an exploded perspective view of the pump installation member.

Referring to FIGS. 1, 2, and 3, the outline of a twin pump 12 installed by using a pump installation member 10 according to the present disclosure is first explained below.

The twin pump 12 has a first pump unit 14 and a second pump unit 16 set to enclose a motor disposed in the center such that the pump units 14 and 16 hold the motor therebetween from opposite sides thereof. In the illustrated example, the first and second pump units 14 and 16 have respective first and second casings 14a and 16a abutted against each other in the center of the twin pump 12. The motor is located in the first and second casings 14a and 16a and unseen from the outside. The first and second pump units 14 and 16 are respectively driven by output shafts extending from the opposite sides of the motor to perform a pumping action, thereby discharging fluid from respective discharge openings 14b and 16b. Piping (not shown) is connected to the discharge openings 14b and 16b to supply fluid through the connected piping.

The pump installation member 10 is formed in a flat plate shape as a whole and is configured to be attached to the lower side of the twin pump 12, as seen in FIG. 1. Specifically, the pump installation member 10 has a first support member 20 and a second support member 22 which support the first pump unit 14 and the second pump unit 16, respectively, and a connecting elastic member 24 connecting the first and second support members 20 and 22 to each other. Further, the pump installation member 10 has leg-shaped installation elastic members 26 to be placed on an installation surface (not shown) of the twin pump 12 and fastened thereto with bolts. The first and second support members 20 and 22 each have a substantially rectangular flat plate shape and are disposed on a single plane so as to be spaced from and opposite to each other such that the opposing edges thereof are parallel to each other. The first and second support members 20 and 22 have somewhat protuberant first and second pump support securing portions 20a and 22a on their respective upper sides. The first and second pump support securing portions 20a and 22a are configured to be assembled to installation portions (not shown) respectively provided at predetermined positions of the first and second casings 14a and 16a and then be secured thereto with bolts.

As has been described above, the first and second casings 14a and 16a are abutted against each other from the opposite sides of the motor (not shown) and connected and secured together. In this regard, the positions of the first and second casings 14a and 16a, when connected and secured to each other, may be misaligned relative to each other. Consequently, the first and second support members 20 and 22 secured to the misaligned first and second casings 14a and 16a, respectively, are misaligned relative to each other according to the misalignment between the first and second casings 14a and 16a. This problem is dealt with by the deformation of the connecting elastic member 24. In the illustrated example, the connecting elastic member 24 comprises two elastic members 24a and 24b in the shape of elongated strips extending along the side edges of the first and second support members 20 and 22, respectively. The elastic members 24a and 24b are configured to be respectively bonded to the lower surfaces of the first and second support members 20 and 22 (i.e. the surfaces of the support members 20 and 22 facing the installation surface of the twin pump). The elastic members 24a and 24b have fitting projecting portions 24c and 24d, respectively, which are fitted into the space between the first and second support members 20 and 22 and which are bonded to the first and second support members 20 and 22 along the opposing edges thereof.

The elastic members 24a and 24b are each provided with leg-shaped installation elastic members 26 extending outward from the respective side edges of the first and second support members 20 and 22. The installation elastic members 26 extend from below the elastic members 24a and 24b, and hence below the first and second support members 20 and 22, toward the installation surface, so that when the pump installation member 10 is placed on the installation surface, the installation elastic members 26 are located between the first and second support members 20 and 22, on the one hand, and the installation surface, on the other hand. In the illustrated example, the leg-shaped installation elastic members 26 have bolt insertion holes 26a, respectively, to pass the shanks of bolts (not shown) for fastening the first and second support members 20 and 22 to the installation surface. Consequently, by inserting bolts through the bolt insertion holes 26a and threadedly engaging the bolts with threaded holes provided in the installation surface, the installation elastic members 26 can be pressed by the heads of the bolts. In the illustrated example, the installation elastic members 26 have bolt head receiving portions 26b, respectively, for receiving the heads of bolts. Accordingly, even if the first and second support members 20 and 22 are misaligned relative to each other and not on the same plane, the installation elastic members 26 are allowed to absorb the misalignment between the first and second support members 20 and 22 by fastening the installation elastic members 26 to the installation surface with the bolts, thereby enabling the first and second support members 20 and 22 to be securely attached to the installation surface.

Although one embodiment of the pump installation member 10 according to the present disclosure has been shown above, the present disclosure is not limited thereto. For example, the installation elastic members 26 are only required to be elastically deformable as the first and second support members 20 and 22 are displaced toward the installation surface when the pump installation member 10 is fastened onto the installation surface. For example, it is possible to use installation elastic members configured to be elastically deformable when fastening bolts are passed through the first and second support members 20 and 22 and threadedly engaged with bolt holes provided in the installation surface. Accordingly, the installation elastic members in this case can be provided directly on the lower surfaces of the first and second support members 20 and 22.

What is claimed is:

1. A pump installation member configured to be attached to a twin pump for installing the twin pump on an installation surface, the twin pump having one motor with output shafts respectively extending to opposite sides thereof, and a first and second pump units attached to the motor from the opposite sides and driven by the output shafts respectively associated therewith, the pump installation member comprising:
   a first support member and a second support member to be secured to predetermined installation portions of the first and second pump units, respectively, the first support member and the second support member being separate members;
   at least one connecting elastic member connecting the first support member and the second support member, the at least one connecting elastic member provided with installation elastic members to be set between the first support member and the second support member and the installation surface;
   wherein the at least one connecting elastic member is configured to deform according to misalignment between the first support member and the second support member caused by the first support member and the second support member being secured to the predetermined installation portions of the first and second pump units, respectively; and
   wherein the installation elastic members are configured to be fastened to the installation surface such that the twin pump is installed on the installation surface through the pump installation member.

2. The pump installation member of claim 1, wherein the first and second support members are each a flat plate-shaped member.

3. The pump installation member of claim 1, wherein the at least one connecting elastic member is attached to lower surfaces of the first and second support members.

4. The pump installation member of claim 1, wherein the first and second support members are each a flat plate-shaped member, and are disposed on a single plane so as to be spaced from and opposite to each other, with opposing edges thereof being parallel to each other.

5. The pump installation member of claim 4, wherein the at least one connecting elastic member comprises two elongated elastic members extending along side edges, respectively, of the first support member and the second support members.

6. The pump installation member of claim 1, wherein the installation elastic members are configured to extend from the at least one connecting elastic member to respective positions extending outward from side edges of the first support member and the second support member.

7. The pump installation member of claim 6, wherein the installation elastic members respectively have bolt insertion holes extending therethrough from a side closer to the first and second support members toward a side closer to the installation surface to pass shanks of bolts for fastening the first and second support members to the installation surface, so that, by inserting bolts through the bolt insertion holes and threadedly engaging the bolts with threaded holes provided in the installation surface, the installation elastic members can be pressed by heads of the bolts.

8. The pump installation member of claim 4, wherein the at least one connecting elastic member has a fitting projecting portion fitted between the opposing edges of the first and second support members and bonded to the first and second support members along the opposing edges thereof.

* * * * *